(12) United States Patent
Li et al.

(10) Patent No.: US 9,152,543 B1
(45) Date of Patent: Oct. 6, 2015

(54) SYMBOLIC EXECUTION WITH AUTOMATIC ABSTRACTIONS

(71) Applicant: FUJITSU LIMITED, Kawasaki-shi, Kanagawa (JP)

(72) Inventors: Guodong Li, San Jose, CA (US); Indradeep Ghosh, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/318,601

(22) Filed: Jun. 28, 2014

(51) Int. Cl.
G06F 11/36 (2006.01)
G06F 9/44 (2006.01)

(52) U.S. Cl.
CPC ........ *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 8,645,924 | B2 * | 2/2014 | Li et al. | 717/132 |
| 2009/0281999 | A1 * | 11/2009 | Sinha | 707/3 |
| 2012/0017119 | A1 * | 1/2012 | Ghosh et al. | 714/38.1 |
| 2012/0192169 | A1 * | 7/2012 | Li et al. | 717/161 |

OTHER PUBLICATIONS

Saswat Anand et al, Symbolic Execution with Abstract Subsumption Checking, 2006, A. Valmari (Ed.): SPIN 2006, LNCS 3925, pp. 163-181.*

Edmund Clarke et al, Counterexample-Guided Abstraction Refinement for Symbolic Model Checking, 2000, Journal of the ACM, vol. 50, No. 5, Sep. 2003, pp. 752-794.*

Ranjit Jhala, Lazy Abstrction, Fall 2004, University of California, Berkeley.*

V. Kuznetsov et al., "Efficient state merging in symbolic execution" PLDI '12 Proceedings of the 33rd ACM SIGPLAN conference on Programming Language Design and Implementation, Jun. 11, 2012.

C.R. Ramakrishnan "RWset: attacking path explosion in constraint-based test generation" TACAS'08/ETAPS'08 Proceedings of the Theory and practice of software, 14th international conference on Tools and algorithms for the construction and analysis of systems, pp. 351-366, Mar. 29, 2008.

S. Bugrara et al. "Redundant state detection for dynamic symbolic execution" USENIX ATC'13 Proceedings of the 2013 USENIX conference on Annual Technical Conference, Jun. 26, 2013.

(Continued)

*Primary Examiner* — Ryan Coyer
*Assistant Examiner* — Daniel Wei
(74) *Attorney, Agent, or Firm* — Maschoff Brennan

(57) ABSTRACT

A method of testing software may include generating a symbolic value for a return value of a software function of a software program during mixed symbolic and abstraction execution ("mixed execution") of the software program. Additionally, the mixed execution may maintain symbolic values, abstract values, and constraints of one or more variables of the software function. The method may also include deriving, during the mixed execution, an abstraction for the symbolic value. The abstraction may constrain the symbolic value and may be derived based on the return value of the paths that satisfy the abstraction. Further, the method may include exploring, during the mixed execution, the one or more paths of the software function that correspond to the return value based on the symbolic value, as constrained by the abstraction, such that a number of the one or more paths explored during the symbolic execution is constrained by the abstraction.

18 Claims, 6 Drawing Sheets

(56) References Cited

OTHER PUBLICATIONS

T. Ball et al., "T. Ball, R. Majumdar, T. Millstein, S. Rajamanj: Automatic Predicate Abstraction of C Programs" roceedings of the ACM SIGPLAN 2001 conference on Programming language design and implementation, Jun. 20, 2001.

T. A. Henzinger et al., "Abstractions from proofs" Proceedings of the 31st ACM SIGPLAN-SIGACT symposium on Principles of programming languages pp. 232-244, Jan. 14, 2004.

Godefroid, P. (Jan. 2007). Compositional dynamic test generation. In ACM SIGPLAN Notices (vol. 42, No. 1, pp. 47-54). ACM.

Patrice Godefroid, Aditya V. Nod, Sriram K. Rajamani, and Sai Deep Tetali, Compositional May-Must Program Analysis: Unleashing the Power of Alternation, in Principles of Programming Languages (POPL), Association for Computing Machinery, Inc., Jan. 2010.

G. Li and I. Ghosh, "Lazy Symbolic Execution through Abstraction and Sub-space Search" pp. 295-310 9th International Haifa Verification Conference, HVC 2013, Haifa, Israel, Nov. 5-7, 2013, Proceedings.

\* cited by examiner

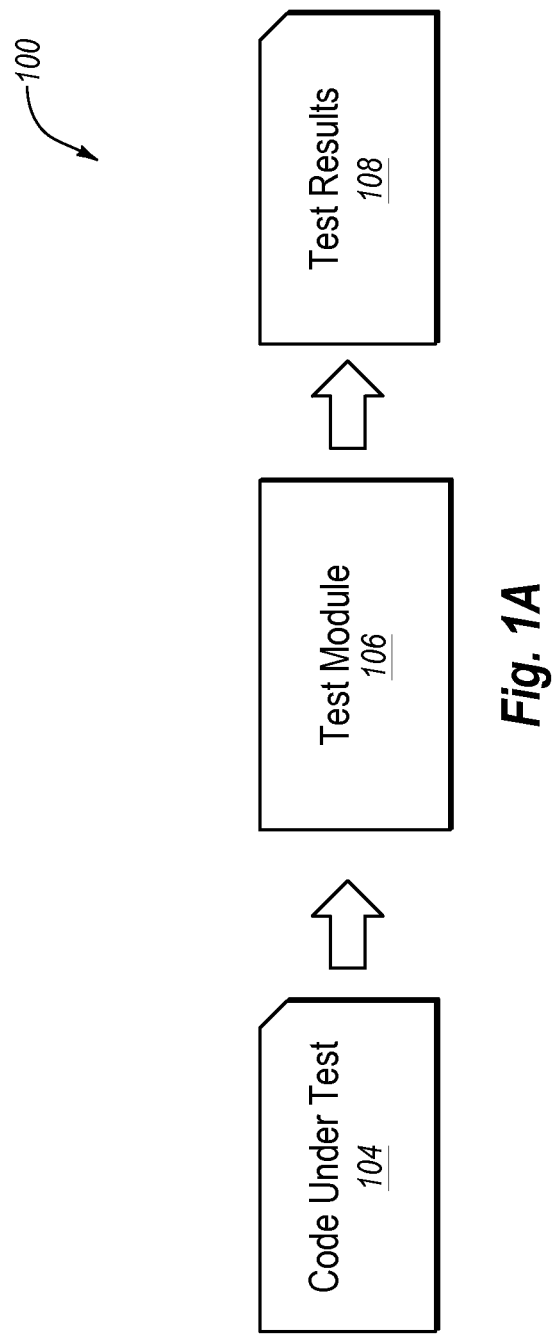

SYMBOLIC EXECUTION WITH AUTOMATIC ABSTRACTIONS

FIELD

The embodiments discussed herein are related to symbolic execution that incorporates automatic abstractions.

BACKGROUND

Testing software, such as validating or verifying software, is a common activity among information technology (IT) organizations. For example, whether the software is a desktop application for execution at one or more client computer systems or a web application for execution at one or more server computer systems, it is often important to verify the quality of the software. While some types of errors in software cause only annoyance or inconvenience to users, other types of errors have the potential to cause other problems, such as data and financial loss.

Symbolic execution may be used to test and verify software by generating test inputs for the software. However, symbolic execution may encounter a state explosion problem for some software, even relatively simple software. The state explosion problem may result in the symbolic execution being time consuming and/or resource intensive to generate corresponding test inputs. In some instances, the amount of processing required from a state explosion may be prohibitive in generating the test inputs.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of testing software may include generating a symbolic value for a return value of a software function of a software program during mixed symbolic and abstraction execution ("mixed execution") of the software program. One or more paths of the software function may include the return value. Additionally, the mixed execution may maintain symbolic values, abstract values, and constraints of one or more variables of the software function. The method may also include deriving, during the mixed execution, an abstraction for the symbolic value. The abstraction may be derived based on the return value of the one or more paths satisfying the abstraction. Additionally, the abstraction may constrain the symbolic value. Further, the method may include exploring, during the mixed execution, the one or more paths of the software function that correspond to the return value based on the symbolic value, as constrained by the abstraction, such that a number of the one or more paths explored during the symbolic execution is constrained by the abstraction.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1A is a diagram representing an example system configured to test software;

DESCRIPTION OF EMBODIMENTS

Figure 1B:
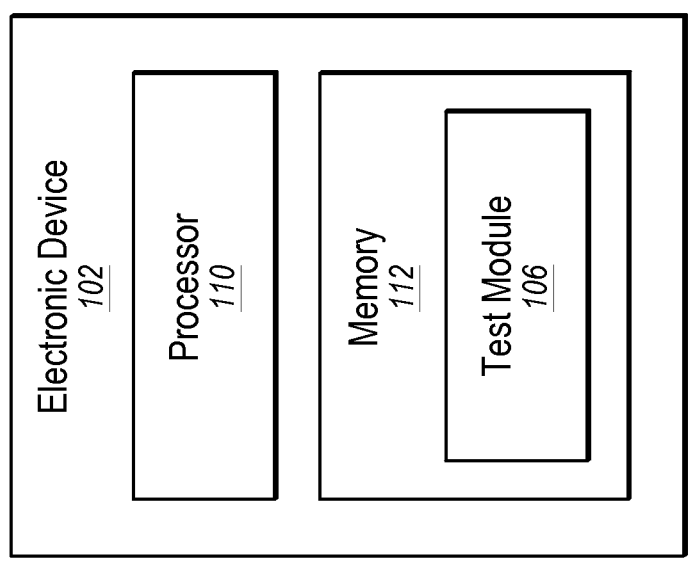
FIG. 1B illustrates an example electronic device that may include the test module of FIG. 1A.

Some embodiments described herein relate to methods and systems of testing software. In some embodiments, to test the software, the software may be symbolically executed. Symbolic execution is a formal software verification technique that is derived from symbolic computation, which uses machines, such as computers, to manipulate mathematical equations and expressions in symbolic form. As applied to software testing, symbolic execution may also be used to analyze if and/or when errors in source code of the software may occur, to predict how code statements affect specified inputs and outputs, and to consider path traversal within the software.

To test software using symbolic execution, symbolic values are generated for variables in the software that act as inputs. The symbolic values may then replace individual concrete input values, such as numbers, strings, true/false, etc., for the software. The operations used to manipulate such variables may be replaced with symbolic versions of the operations such that the symbolic formulas and values may be manipulated instead of concrete values. The software may then be executed, in which the symbolic formulas and values may be solved and a test case may be generated for the software based on the solutions to the symbolic formulas.

The software to be tested may include multiple paths formed from one or more software statements, such as conditional statements, assignment statements, equations, other lines of code of the software, block(s) of lines of code of the software, and/or multiple statements within the software. The symbolic formulas may be derived from the different paths of the software that may be generated at different decision points included in the software. The decision points may indicate which path may be taken based on the value of one or more of the input variables. Accordingly, as the number of different possible values for each input variable increases, the number of paths that may be explored by a typical symbolic executor may also increase at an exponential rate. Therefore, even a relatively small number of decision points may lead to a very large number of paths, which may lead to a path explosion problem (also referred to as a state explosion problem). The path explosion problem may not allow traditional symbolic execution to scale to larger programs because the number of potential paths to explore may be prohibitively time consuming, difficult to perform, and/or resource intensive.

As detailed below according to at least one embodiment described herein, the symbolic execution may be modified to reduce the number of paths that may be explored by the symbolic executor such that occurrences of the path explosion problem may be reduced. For example, one or more paths of a software function that may be explored during symbolic execution of a software program may include a return value. During symbolic execution of the software program, a symbolic value for the return value may be generated.

Additionally, an abstraction for the symbolic value may be derived from the software program during the symbolic execution. The abstraction may constrain the symbolic value such that the number of paths explored during the symbolic execution may be limited by the constraint of the abstraction. Further, the abstraction may be derived based on the return value of the one or more paths such that the return value satisfies the abstraction—e.g., such that the return value is within the bounds of the abstraction. The software function may then be replaced during the symbolic execution with an assumption for the symbolic value and with a declarative function. The assumption may be generated based on the abstraction such that the assumption constrains the symbolic value. The declarative function may be generated based on the symbolic value as constrained by the assumption and based on the software function.

The paths of the software function that correspond to the return value may then be explored by executing the declarative function. Due to the declarative function being based on the symbolic value as constrained by the assumption and being based on the software function, the paths explored by executing the declarative function may be limited to those paths that satisfy the abstraction. In contrast, in traditional symbolic execution, the symbolic value may not be constrained such that some unnecessary paths (e.g., paths with return values that do not satisfy the abstraction) may be explored, which may lead to the path explosion problem. Symbolic execution that reduces the number of paths explored as described herein may be referred to as "lazy symbolic execution."

Embodiments of the present invention will be explained with reference to the accompanying drawings.

FIG. 1A is a diagram representing an example system 100 configured to test software, arranged in accordance with at least one embodiment described herein. The system 100 may include a test module 106 configured to perform symbolic execution with respect to code under test 104 of a software program to generate test results 108 of the software program. The code under test 104 may include electronic data, such as, for example, the software program, code of the software program, libraries, applications, scripts, or other logic or instructions for execution by a processing device. In some embodiments, the code under test 104 may include a complete instance of the software program. In these or other embodiments, the code under test 104 may include a portion of the software program. The code under test 104 may be written in any suitable type of computer language, such as Java, C, C++, Pearl, Scheme, Python, among others.

The code under test 104 may include portions of the software program organized into a number of software modules. The software modules may include code that performs specific functionalities of the software modules. Code that performs specific functionalities may be referred to as a software function.

The test module 106 may be configured to perform lazy symbolic execution with respect to the code under test 104. During the lazy symbolic execution, the test module 106 may be configured to determine possible paths of the code under test 104. The possible paths may contain or yield sets of constraints and the test module 106 may be configured to attempt to solve the constraints. When the constraints may be solved in context with one another, the corresponding path may be determined to be satisfiable. When the constraints may not be solved in context with one another, the corresponding path may be determined to be unsatisfiable. Based on such determinations, the portion of the code under test 104 corresponding to a particular path may be identified as satisfiable, containing errors, or unknown as to satisfiability.

The lazy symbolic execution performed by the test module 106 may reduce the number of paths that may be explored such that the number of constraints that may be solved may also be reduced. Therefore, the lazy symbolic execution may reduce the amount of processing involved in determining the satisfiability of the code under test 104. In some embodiments, the test module 106 may perform the lazy symbolic execution according to flow 200 and methods 300, 400, and 500 described in detail below with respect to FIGS. 2, 3, 4, and 5, respectively.

In some embodiments, the test module 106 may be configured to produce the test results 108 from testing the code under test 104. The test results 108 may indicate whether portions of the code under test 104 have been determined to be satisfiable or unsatisfiable. In these or other embodiments, the test module 106 may generate one or more solutions for one or more sets of constraints when the constraints are satisfiable. In some embodiments, solving a set of constraints may include attempting to find one or more solutions that satisfy all the constraints included in the set. In some of these embodiments, the test module 106 may include the solutions with the test results 108. In some embodiments, the solutions may be used to test the code under test 104.

FIG. 1B illustrates an example electronic device 102 that may include the test module 106, according to at least one embodiment described herein. The electronic device 102 may include any suitable system, apparatus, or device configured to test the code under test 104 using the test module 106. The electronic device 102 may include a processor 110 communicatively coupled to a memory 112. In some embodiments, the test module 106 may be embodied in logic or instructions resident in the memory 112 for execution by the processor 110.

The processor 110 may be any suitable special-purpose or general-purpose computer, computing entity, or processing device including various computer hardware or software modules and may be configured to execute instructions stored on any applicable computer-readable storage media. For example, the processor 110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1B, it is understood that the processor 110 may include any number of processors configured to perform any number of operations. In some embodiments, the processor 110 may interpret and/or execute program instructions and/or process data stored in the memory 112.

The memory 112 may include computer-readable storage media for carrying or having computer-executable instructions or data structures stored thereon. Such computer-readable storage media may be any available media that may be accessed by a general-purpose or special-purpose computer, such as the processor 110. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 110 to perform a certain function or group of functions.

The test module 106 may include instructions and data configured to cause the processor 110 to perform lazy symbolic execution. Accordingly, the electronic device 102 may incorporate the test module 106 to perform lazy symbolic execution to test the code under test 104. As indicated above, the test module 106 may be configured in a manner that may reduce the number of paths explored during the lazy symbolic execution as compared to traditional symbolic execution.

Figure 2:
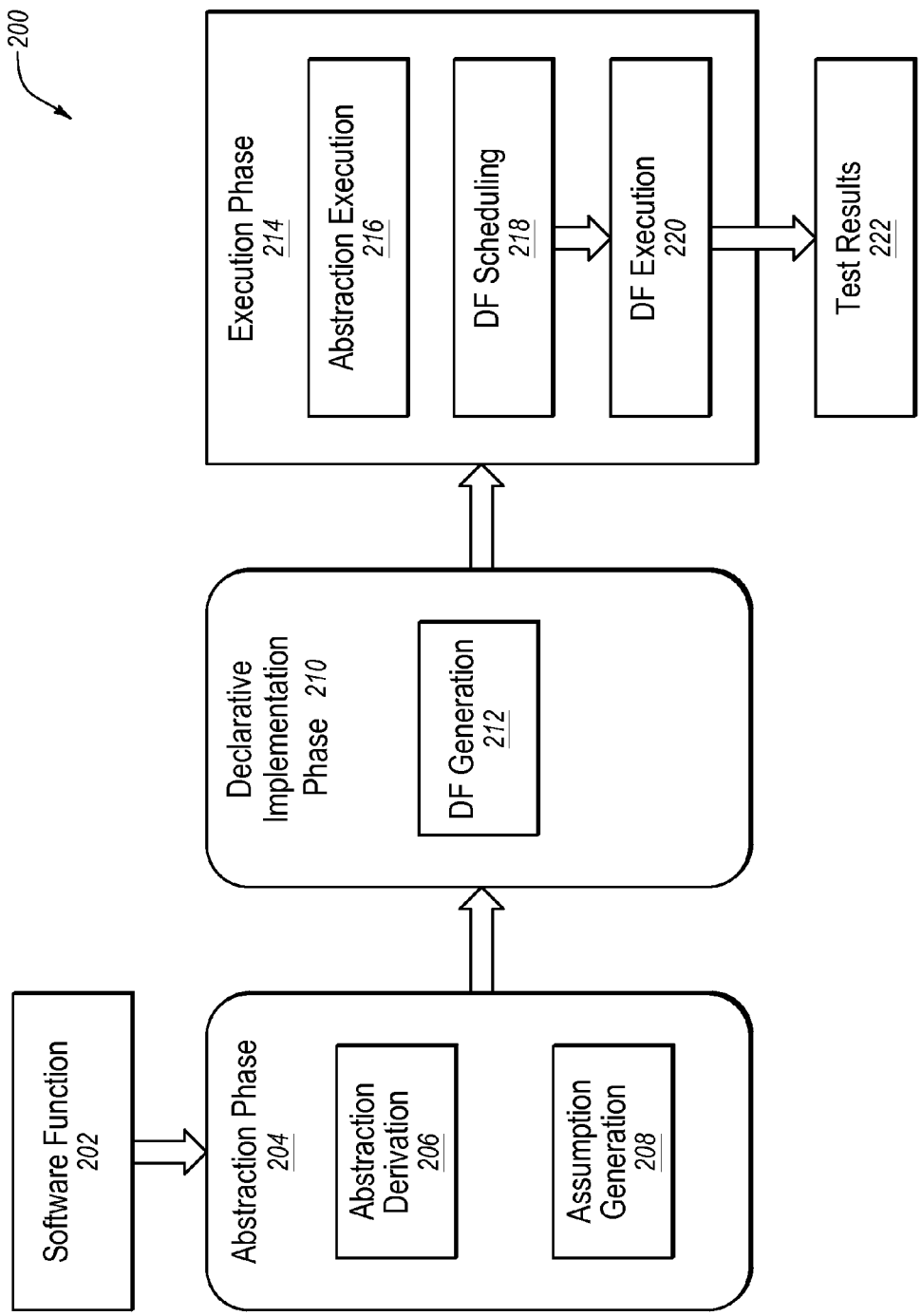
FIG. 2 is a flowchart of an example flow that may be used to perform lazy symbolic execution.

FIG. 2 is a flowchart of an example flow 200 that may be used to perform lazy symbolic execution, according to at least one embodiment described herein. The flow 200 may be performed by any suitable system, apparatus, or device. For example, the test module 106 of the electronic device 102 of FIG. 1B may perform one or more of the operations associated with the flow 200. Although illustrated with discrete blocks, the steps and operations associated with one or more of the blocks of the flow 200 may be divided into additional blocks, combined into fewer blocks, or eliminated, depending on the desired implementation.

The flow 200 may be performed during symbolic execution of one or more portions of a software program that may act as code under test, such as the code under test 104 of FIG. 1A. The flow 200 may be configured such that the symbolic execution being performed is lazy symbolic execution. The flow 200 may be configured to perform a series of operations with respect to one or more software functions that may be included in the software program. For purposes of description, the flow 200 is described with respect to a software function 202 with the understanding that the flow 200 may be applied to any number of software functions at the same time or at different times. In the illustrated embodiment, the operations of the flow 200 may be performed in an abstraction phase 204, a declarative implementation phase 210, and an execution phase 214.

The abstraction phase 204 may include an abstraction derivation 206 and an assumption generation 208. The abstraction derivation 206 may be configured to derive abstractions that may constrain one or more symbolic values of the software function 202 such that the abstractions may be used to constrain which paths of the software function 202 may be explored during the lazy symbolic execution.

In some embodiments, during the abstraction derivation 206, one or more variables and values of the software function 202 may each be given a symbolic value and an associated abstraction during symbolic execution of the software function 202. One or more of the symbolic values and abstractions given may be for a return value that may be included in the software function 202.

An abstraction may be a constraint or limit on what the values of its associated symbolic value may be. In some instances, the abstraction may be an interval that may be a boundary as to what the value range of its associated symbolic value may be. In other instances, such as when an interval may not be suitable for constraining the symbolic value, the abstraction may be a symbolic predicate that may limit the symbolic value in which the symbolic predicate may be of the format "p⇒ q" indicating that if "p" is true" then "q" is also true. Further examples of the abstraction as an interval or a symbolic predicate are included below.

During the abstraction derivation 206 of the lazy symbolic execution, a control flow of the software function 202 may be walked through and used to derive and refine the abstract values. The control flow may include one or more instructions that may generate different types of processing operations with respect to the software function 202. The refining of the abstractions may be based on the different types of processing operations that may be associated with different instructions of the software function 202. For example, the instructions may be associated with a data processing instruction, a branch point, a branch merge point, and/or a jump. Additionally, an abstraction for a return value of one or more paths of the software function 202 may be derived from the control flow and the return value such that the return value may be used to help define the abstraction. Therefore, the abstraction may be based on the return value such that the return value may satisfy—e.g., be within the bounds of-the abstraction. Further detail regarding the abstraction derivation 206 is given below with respect to FIG. 3.

The abstraction phase 204 may also include the assumption generation 208. The assumption generation 208 may be performed in conjunction with the abstraction derivation 206 or may be performed after the abstraction derivation 206. During the assumption generation 208, an assumption may be generated for a symbolic value that is associated with a return value of the software function 202. The assumption may be an assumption of a range of potential values of the return value and may be generated from the abstraction corresponding to the return value and the associated symbolic value. Further detail is given with respect to the assumption generation 208 with respect to FIG. 3 below.

Figure 3:
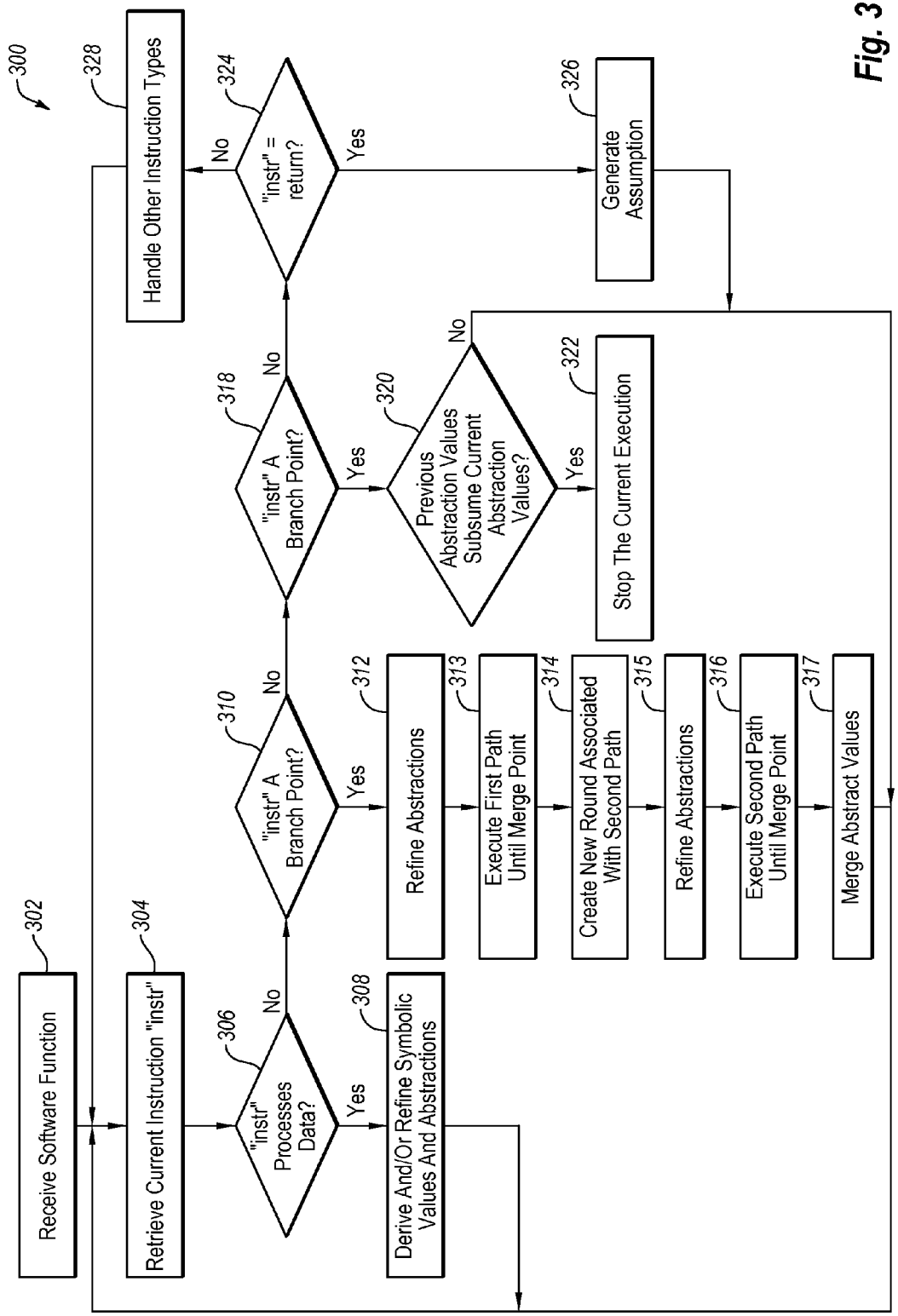
FIG. 3 is a flowchart of an example method of deriving abstractions.

Therefore, as described in further detail with respect to FIG. 3, the abstraction phase 204 may perform a mixed symbolic and abstraction execution (also referred to herein as a "mixed execution") by maintaining symbolic values and associated abstract values for variables of the software function 202. For example, for a variable "v" of the software function 202, the abstraction phase 204 may derive and update both a symbolic value "$v_s$" and an abstract value "$v_a$" that may correspond to the variable "v." Additionally, during the abstraction phase 204, constraints on "$v_s$" and "$v_a$" may be maintained and used to control the symbolic execution. For instance, the symbolic value "$v_s$" may be used to determine branch feasibility, and the abstract value "$v_a$" may be used to determine loop termination.

Following the abstraction phase 204, the flow 200 may proceed to the declarative implementation phase 210. During the declarative implementation phase 210, a declarative function (DF) may be generated for the software function 202 via a declarative function generation 212. The declarative function generation 212 may generate the declarative function based on the software function 202 and based on the symbolic value associated with the return value, which may be constrained by the assumption generated during the assumption generation 208. For example, the declarative function may be generated by extending the software function 202 through the addition of the symbolic value associated with the return value as an extra argument of the software function 202 such that the declarative function is a modification of the software function. In these or other embodiments, an object corresponding to the software function 202 may be added to the declarative function as another argument such that the object is an additional extension of the software function 202 included in the declarative function. Further detail regarding the declarative function generation 212 is described below with respect to FIG. 4.

Following the abstraction phase 204 and the declarative implementation phase 210, the lazy symbolic execution of the flow 200 may proceed to the execution phase 214. In some embodiments, the execution phase 214 may include an abstraction execution 216 and a declarative function (DF) execution 220.

In some embodiments, the execution phase 214 may also include declarative function scheduling 218. The abstraction execution 216 may include executing one or more assumptions that may be generated during the assumption generation 208. The assumptions executed in the abstraction execution 216 may be associated with the software function 202 or with different software functions. In some embodiments, the abstraction execution 216 may execute an associated abstraction when a function corresponding to the abstraction is called. When the abstraction execution step 216 reaches the end of a path in its corresponding function, the flow 200 may proceed to the declarative function execution.

The declarative function execution 220 may include executing one or more declarative functions generated during the declarative function generation 212. The declarative functions executed in the declarative function execution 220 may be associated with the software function 202 or with different software functions. Accordingly, the main portion of a function (which may be included in an associated declarative function) may be delayed to be executed at the end of a path of the abstraction execution. The execution of the assumption(s) and the declarative function(s) may be used to generate test results 222 of the software program that includes the software function(s) 202. In some embodiments, the test results 222 may be analogous to the test results 108 described with respect to FIG. 1A.

The execution of the assumption(s) and the declarative function(s) may be performed instead of the execution of the software function 202 or other software functions. As mentioned above, the assumption(s) and the declarative function(s) may be derived based on the software function 202 or other software functions. Therefore, the software function 202 or other software functions may be explored through execution of the assumption(s) and the declarative function(s), which may be constrained by the limits associated with the assumption(s). In contrast, traditional symbolic execution may explore software functions without any constraints.

The declarative function scheduling 218 may be configured to determine an order in which to execute the declarative functions and may be used when there is more than one declarative function. In some instances, multiple declarative functions may access one or more of the same variables such that the declarative functions may be dependent with respect to each other based on the shared access to the same variables. Additionally, dependent declarative functions may conflict with each other due to conflicts between the shared variables such that one or more paths of the declarative functions may become irrelevant for exploring. For example, a path associated with a variable of the first declarative function may become infeasible due to a conflict with respect to the same variable in a second declarative function that is dependent on the first declarative function.

According to at least one embodiment, the declarative functions may be ordered and scheduled based on dependency such that declarative functions that are dependent with respect to each other may be executed in groups according to their dependency. Therefore, when a conflict is found between declarative functions that are dependent with respect to each other, the remaining declarative functions that are also dependent with the conflicting declarative functions and that have not been executed yet may be skipped because a conflict has already been found. Therefore, the scheduling of the declarative functions in this manner may reduce the amount of infeasible paths explored and the corresponding unnecessary processing that may be performed. Further detail with respect to the declarative function scheduling 218 and associated execution based on the scheduling is given below with respect to FIG. 5.

Therefore, the flow 200 may be used to perform lazy symbolic execution of code under test (e.g., the software function 202) to reduce the number of paths that may be explored as compared to the number of paths that may be explored during traditional symbolic execution. The reduction in the number of paths that may be explored may reduce the amount of processing that may be performed during the lazy symbolic execution of the code under test as compared to traditional symbolic execution and may also reduce the likelihood of path explosion.

FIG. 3 is a flowchart of an example method 300 of deriving abstractions, arranged in accordance with at least one embodiment described herein. The method 300 may be implemented, in some embodiments, by a testing system, such as the test module 106 of FIGS. 1A and 1B. Additionally, in some embodiments, the method 300 may be used to perform one or more operations associated with the abstraction phase 204 of the flow 200 of FIG. 2. Although illustrated as including discrete blocks, various blocks of the method 300 may be divided into additional blocks, combined into fewer blocks, or eliminated, depending on the desired implementation.

The method 300 may begin at block 302, where a software function may be retrieved. For example, the software function 202 of FIG. 2 may be retrieved at block 302. The abstraction phase 204 may include multiple execution rounds, which may each calculate a portion of abstraction information. In some embodiments, the entire execution may be finished when no further abstraction information may be obtained. The initial round may execute the software function 202 from the first instruction. More rounds may be created during the execution. In each round, the current instruction may be executed, and the next instruction will be executed when the current one is done.

At block 304, a current instruction "instr" of the software function may be retrieved. The current instruction "instr" may be the next instruction that may be encountered by the test module while moving through the software function during mixed execution of the software function. At block 306, it may be determined whether the current instruction is associated with a data processing instruction. When the current instruction is associated with a data processing instruction, the method 300 may proceed from block 306 to block 308.

At block 308, symbolic values and associated abstract values may be generated and derived based on the data processing instruction. In some embodiments, a variable may be given a symbolic value as well as an abstract value. The symbolic value records the exact value of this variable under the current path condition, while the abstract value depicts the approximate value of this variable under the current path condition. An abstract value can be represented by an interval, a polygon, or some other geometry domain. The abstract values together with the constraints over them are called "abstractions." That is, an abstraction may not only specify the possible abstract values of the variables, but also depict the relationships between these variables with respect to the abstract values. For example, the data processing instruction may include variables "c" and "a" and symbolic values "$c_s$," and "$a_s$," may be assigned to the variables "c" and "a," respectively. Additionally, abstract values "$c_a$" and "$a_a$" may be assigned to the variables "c" and "a," respectively.

Additionally, when the current instruction is associated with a data processing instruction, at block 308, the corresponding abstractions and symbolic values may be refined based on the relationships indicated by the data processing instruction. For example, the data processing instruction may be "c=a+10" such that a symbolic expression "$c_s=a_s+10$" may be generated using the symbolic values "$c_s$" and "$a_s$." Additionally, the abstract value "$a_a$" may be an interval defined by "$a_a=[i, j]$," which may have been derived previously. Therefore, for the data processing instruction "c=a+10," the abstract value "$c_a$" may be updated to be defined as "$c_a=[i+10, j+10]$" based on the boundaries of the symbolic value "$a_s$" as indicated in the abstract value "$a_a=[i, j]$" and based on the relationship between the variable "a" and associated symbolic value "$a_s$" and the variable "c" and associated symbolic value "$c_s$" of the data processing instruction "c=a+10." Following block 308, the method 300 may return to block 304 where another instruction that may follow the previous instruction may be retrieved as the current instruction.

When the current instruction is not associated with a data processing instruction, the method 300 may proceed from block 306 to block 310. At block 310, it may be determined whether or not the current instruction is a branch point of the software function. When the current instruction is a branch point of the software function, the method 300 may proceed from block 310 to block 312.

At block 312, the abstractions associated with the software function branching into a first path at the branch point may be refined. When the instruction is associated with a branch point, one or more of the corresponding abstractions may be refined by an intersection of the abstraction with the conditions associated with the different paths that may spawn from the branch point. For example, for an instruction "if (c>10)" the software function may branch into a first path when a first path condition "c>10" is met and may branch into a second path when a second path condition "c≤10" is met. Accordingly, at block 312, a first representation "$c_{a1}$" of the abstract value "$c_a$" associated with the first path may be refined with respect to the first path condition with the following expression "$c_{a1}=c_a\cap[11,+\infty]$."

At block 312, in some embodiments, it may be desired that the symbolic value "$c_s$" (rather than the abstract value "$c_a$") is used to determine whether "c>10" is satisfiable, For instance, suppose "$c_s=5$" and "$c_a=[0,20]$" before the branch condition. In this example, the condition "c>10" may be unsatisfiable in terms of the symbolic value "$c_s$", while it may be satisfiable if the abstract value "$c_a$" is used. On the other hand, the abstract value may be used for branches controlling loops so as to warrant the termination of the computation. As such, this mixed symbolic and abstract execution (referred to also as "mixed execution") mechanism may be able to obtain a good balance between accuracy and efficiency.

At block 313, the first path may be executed until a merge point where the first path may merge with a second path. A merge point may be the first node in the control flow graph where the first and second paths converge, e.g., the first post-dominator in the control flow graph. For example, the next statement following an "if-else" statement may indicate a branch merge point of the first path and the second path. Another example is a loop header where the loop iterations converge.

At block 314, a new round associated with the second path may be created and scheduled. For example, a new round associated with the path condition "c≤10" may be created and scheduled to execute after the execution of the path condition "c>10" is over. Both rounds may be later synchronized at the merge point such that they will be merged into one round at the merge point.

At block 315, one or more of the abstractions associated with the software function branching into the second path at the branch point may be refined. For example, as indicated above, for the instruction "if (c>10)" the software function may branch into the second path when the second path condition "c≤10" is met. As such, a second representation "$c_{a2}$" of the abstract value "$c_a$" associated with the second path may be refined with respect to the second path condition with the following expression "$c_{a2}=c_a\cap[-\infty,10]$." At block 316, the second path may be executed until the merge point.

At block 317, the first and second representations of an abstraction associated with the first and second paths merging at the branch merge point may be refined based on the merging. In some embodiments, the abstraction may be merged by a union of the first representation of the abstraction with the second representation of the abstraction. For example, the abstract value "$c_a$" at the branch merge point may be refined by the following expression: "$c_a=c_{a1}\cup c_{a2}$." Following block 317, the method 300 may return to block 304 where another instruction that may follow the previous instruction may be retrieved as the current instruction.

In some embodiments, the abstraction of a branch may be maintained as a predicate of format "p⇒q" indicating that "p" implies "q." For example, at the branch merge point, the abstraction on "$c_a$" for the first path may be kept as: "c>10⇒$c_a=c_{a1}$" and the abstraction for the second path may be kept as "c≤10⇒$c_a=c_{a2}$." These predicates may describe the abstraction values as well as the associated path conditions. In some embodiments, these predicates may be used to obtain combined abstract values "$c_a=c_{a1}\cup c_{at}$" by eliminating the path conditions.

When the current instruction is not associated with a branch point at block 310, the method 300 may proceed from block 310 to block 318. At block 318, it may be determined whether the current instruction is a "jump" instruction. When the current instruction is a jump instruction, the method 300 may proceed from block 318 to block 320.

At block 320, it may be determined whether a previous abstract value of a variable includes or subsumes a current abstract value of this variable after the jump instruction. When the previous abstract value does not include or subsume the current abstract value after the jump instruction, the method 300 may proceed from block 320 to block 304. When the previous abstract value includes or subsumes the current abstract value after the jump instruction, the method 300 may proceed from block 320 to block 322.

For example, the jump instruction may be associated with a "while" loop that may continue while an integer variable "i" is less than a certain number. In the present example, at the end of the "while" loop, the variable "i" may also be incremented before entering the "while" loop again. Additionally, the variable "i" may have an associated abstract value "$i_a$" that may be updated when the variable "i" is incremented. The updated abstract value "$i_a$" may be a subset of the previous abstract value "$i_a$" due to the incrementation such that the previous abstract value of "$i_a$" may include or subsume the current abstract value "$i_a$." By way of example, the abstract value "$i_a$" may be an interval "[a, b]" before the incrementation is encountered, and when the incrementation is encountered, the abstract value "$i_a$" may be updated based on the incrementation such that the abstract value "$i_a$" may be an interval "[a+1, b]." Therefore, with respect to this particular example, it may be determined at block 320 that the previous abstract value "$i_a$" includes or subsumes the current abstract value "$i_a$" because the interval "[a+1, b]" is within the interval "[a, b]."

At block 322, the mixed execution associated with the jump may be stopped because when the previous abstraction subsumes the current abstraction, the abstraction may not be further refined. In this case, the current round of mixed execution may terminate since a fixed-point on the abstract values has been reached in this round. Then the executor may execute the next available round (e.g., using the method 300). When there are no rounds left in the executor, the entire abstraction phase may finish as discussed above.

When the current instruction is not associated with a "jump" at block 318, the method 300 may proceed from block 318 to block 324. At block 324, it may be determined whether the current instruction is a "return" instruction. When the current instruction is a "return" instruction, the method 300 may proceed from block 324 to block 326. At block 326, an assumption may be generated for an abstraction that corresponds to a return value of the "return" instruction. In some embodiments, block 326 may be part of the assumption generation 208 of the flow 200 in FIG. 2. In some embodiments, the abstraction that corresponds to the return value may be generated at block 326 and then the corresponding assumption may be generated. In these or other embodiments, one or more other operations may be performed with respect to one or more other instructions between the generation of the abstraction and the generation of the corresponding assumption at block 326. The abstraction that corresponds to the return value may be generated such that it may have any suitable format that may apply to the return value.

For example, the return value may be an integer, the abstraction for the return value may be an interval "[a, b]," and the symbolic value associated with the return value may be "i." Based on these above properties, the assumption generation at block 326 may generate an assumption instruction that constrains the symbolic value "i" between "a" and "b." By way of example, the assumption generation 208 may generate the following instruction to constrain the symbolic value "i" between "a" and "b": "_assume(i>=a && i<b)."

As another example, when the return value is a Boolean value, the corresponding abstraction may be a symbolic predicate and the assumption may be based on the symbolic predicate. For example, the software function 202 may include the following lines of code:

bool operator==(string s1, string s2) {
    if (s1.len !=s2.len) return false;
    for (int k=0; k<s1.len; k++) {
      if (s1[k] !=s2[k])
        return false;
    }
    return true;
    }

Accordingly, when "s1.len" is not equal to "s2.len," the return value may be false such that the following symbolic predicate expression may be used as the abstraction: "s1.len !=s2.len⇒ retval=false." Based on the above code, the following code associated with the assumption generation 208 may be generated:

bool b=new_symbolic_var( ); // retval
    _assume(s1.len==s2.len ∥ ~b);

In the above code, "b" may be a symbolic value of the return value and the abstraction as a symbolic predicate may be that "s1.len==s2.len" or "b" is false such that the assumption "assume(s1.len==s2.len ∥ ~b)" may be generated. Following block 326, the method 300 may return to block 304.

When the current instruction is not a "return" instruction at block 324, the method 300 may proceed to block 328. At block 328, other instruction types may be handled according to their semantics.

Accordingly, the method 300 may be used to derive abstractions and generate assumptions according to at least one embodiment described herein. An example of how the method 300 may be used in conjunction with a specific function is given with respect to Tables 1 and 2, described below. One skilled in the art will appreciate that the functions performed in the method 300 may be implemented in differing order. Furthermore, the outlined steps and actions are only provided as examples, and some of the steps and actions may be optional, combined into fewer steps and actions, or expanded into additional steps and actions without detracting from the essence of the disclosed embodiments. For example, a line of code may include more than one instruction that may be more than one type of instruction. Accordingly, more than one instruction type may be walked through and processed according to the method 300 for one line of code.

Figure 4:
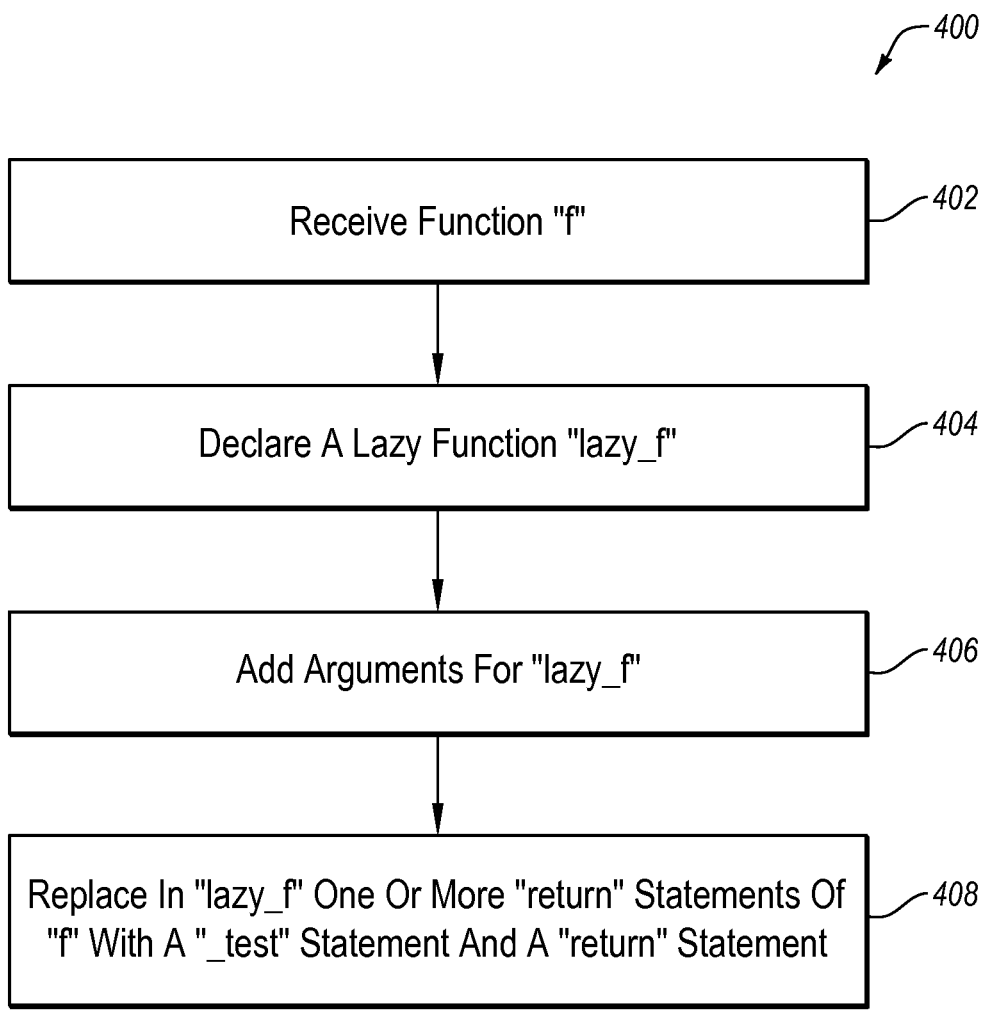
FIG. 4 is a flowchart of an example method of generating a declarative function based on a software function.

FIG. 4 is a flowchart of an example method 400 of generating a declarative function based on a software function (e.g., the software function 202 of FIG. 2), arranged in accordance with at least one embodiment described herein. The method 400 may be implemented, in some embodiments, by a testing system, such as the test module 106 of FIGS. 1A and 1B. Additionally, in some embodiments, the method 400 may be used to perform one or more operations associated with the declarative implementation phase 210 of the flow 200 of FIG. 2. Although illustrated as including discrete blocks, various blocks of the method 400 may be divided into additional blocks, combined into fewer blocks, or eliminated, depending on the desired implementation.

The method 400 may begin at block 402, where a function "f" may be received. For example, the software function 202 of FIG. 2 may be received at block 402. At block 404, a "lazy" function "lazy_f" may be declared based on the function "f." For example, "lazy_f" may be declared and formed as having substantially the same control flow as "f."

At block 406, one or more arguments may be added to "lazy_f." In some embodiments, "lazy_f" may start out as a copy of "f" and the arguments may be added to "lazy_f" such that "lazy_f" may be an extension of "f" with the added arguments providing the extension. In some embodiments, a symbolic value associated with a return value of "f" may be added as an argument of "lazy_f." In these or other embodiments, an object associated with "f" may also be added as an argument of "lazy_f." An example of adding the arguments with respect to a specific function is given with respect to Table 3 described below.

At block 408, one or more "return" statements of "lazy_f" (which may be return statements of "f") may each be replaced with a "_test" statement and a corresponding "return" statement. In some embodiments, each "return" statement of the "lazy_f" may be replaced with a "_test" statement and a corresponding "return" statement. The "_test" statement may instruct the executor to stop the current path if the associated predicate is false.

An example of replacing the return statements is given with respect to Table 3 indicated above and described below. Following block 408, "lazy_f" may be used as a corresponding declarative function of "f."

Accordingly, the method 400 may be used to generate a declarative function based on a software function according to at least one embodiment described herein. One skilled in the art will appreciate that the functions performed in the method 400 may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

Below is an example application of an abstraction phase (e.g., the abstraction phase 204 of FIG. 2) and a declarative implementation phase (e.g., the declarative implementation phase 210 of FIG. 2) with respect to a software function "int find_last_of" (referred to hereinafter as the function "int find_last_of") depicted below in Table 1.

TABLE 1

| | |
|---|---|
| 1. | this object: string s |
| 2. | int find_last_of(char c, int pos = −1) { |
| 3. | int len = this.length( ); |
| 4. | int pos = pos > len ? len : pos; |
| 5. | for (int k = pos; k > 0; −−k) { |
| 6. | if (s[k−1] == c) |
| 7. | return k − 1; |
| 8. | } |
| 9. | return −1; |
| 10. | } |

The code of line 2 of Table 1 defines the function "int find_last_of" and the code of line 1 defines that the function "int find_last_of" may include a string object "s." Lines 3 and 4 of Table 1 include statements of the function "int find_last_of" that may be assignment statements. The assignment statements may be data processing instructions that may be processed to derive symbolic values and associated abstractions, such as described above with respect to blocks 306 and 308 of FIG. 3. For example, a symbolic value "s.len" and an associated abstract value "$len_a$" may be derived and defined from the statement "int len=this.length( )" of line 3 of the above-listed code with the following expressions: "len=s.len" and "$len_a$=[s.len, s.len]." Additionally, a symbolic value "$pos_s$" and an associated abstract value "$pos_a$" may be derived and defined from the statement "int pos=pos>len ? len:pos;" of line 4 with the following expressions: "$pos_s$=$pos_s$>s.len ? s.len:$pos_s$" and "$pos_a$=[−∞, s.len]."

Line 5 of the above-listed code may include instructions for a "for" loop that may be a branch point that may be used to further derive and define one or more symbolic values and abstractions, such as described above with respect to blocks 310, 312, 313, 314, 315, and/or 316 of FIG. 3. Additionally, line 5 may also include assignment statements that may be data processing instructions such that one or more operations associated with blocks 306 and 308 may also be performed with respect to line 5. With respect to line 5, two different paths may result from the instruction "for (int k=pos; k>0; −−k)" where a first path may be spawned when "pos" is less than or equal to "0" such that the "for" loop may not be entered. Additionally, a second path may be spawned when "pos" is greater than "0" such that the "for" loop may be entered. Each path may be executed in a mixed execution round. The two execution rounds may synchronize at the merge point at line 5.

When "pos" is less than or equal to "0," the "for" loop of line 5 may be ignored and, as the first path, the code may proceed to line 9, where a return value of "−1" may be generated. In some embodiments, a first symbolic return value "$retval_s^1$" and an associated first return abstract value "$retval_a^1$" may be derived and defined (e.g., such as at block 326 of the method 300) based on the return value of "−1" corresponding to when the path condition "pos<=0" associated with the first path is satisfied. In some embodiments, the first symbolic return value "$retval_s^1$" and the first return abstract value "$retval_a^1$" may be derived and defined as follows: "$retval_s^1$=−1" and "$retval_a^1$=[−1, −1]."

When "pos" is greater than "0," the "for" loop of line 5 may be entered as the second path. Additionally, one or more symbolic values and associated abstractions may be generated and/or refined based on the instructions, conditions, and definitions associated with entering the "for" loop that are included in line 5. For example, for the path condition "pos>0" associated with entering the "for" loop, the abstract value "$pos_a$=[−∞, s.len]" associated with the symbolic value "$pos_s$" may be refined by the following expression: "$pos_a$=[−∞, s.len]∩[1, +∞]=[1, s.len]." Additionally, a symbolic value "$k_s$" may be derived and defined from the expression "int k=pos" of line 5 with the following expression: "$k_s$=$pos_s$." Further, an abstract value "$k_a$" associated with the symbolic value "$k_s$" may be derived and defined from the expression "$k_s$=$pos_s$" and the refining of the abstract value "pos." with the following expression: "$k_a$=$pos_a$=[1, s.len]."

Line 6 within the "for" loop of line 5 includes an "if" statement that when satisfied may cause the function "int find_last_of" to proceed to line 7, which may be associated with a return value of "k−1." Accordingly, a second symbolic return value "$retval_s^2$" and an associated second return abstract value "$retval_a^2$" may be derived and defined based on the return value of "k−1" corresponding to when the path condition "pos>0∧ s[k−1]==c" associated with the second path is met. In some embodiments, the second symbolic return value "$retval_s^2$" and the second return abstract value "$retval_a^2$" may be derived and defined based on the expression "$k_a$=$pos_a$=[1, s.len]," derived above, and based on the instruction "return k−1" of line 7 as follows: "$retval_a^2$=$k_a$−1=[1, slen]−1=[0, s.len−1]."

Due to the "for" loop at line 5, the function "int find_last_of" included in Table 1 may jump back to line 5 after line 7. Accordingly, in some embodiments, one or more operations associated with blocks 318 and 322 of the method 300 may be performed with respect to the jump back to line 5. Additionally, one or more operations of the method 300 associated with other instruction types that may be included in line 5 may be performed.

For example, the operations "−−k" and "k=pos" may be executed such that a subsequent iteration of the "for" loop may be executed. Due to the path condition "k>0," the decrementing in the operation "−−k," and the expression "k=pos" in line 5 of the function "int find_last_of," in order to stay within the "for" loop (and consequently enter the second path) the path condition after the decrementing may be expressed as: "pos−1>0." Accordingly, the abstract value "$k_a$" may be refined based on the path condition of "pos−1>0" and may be refined from a previous expression of "$k_a$=$pos_a$=[1, s.len]" to a subsequent expression of "$k_a$=$pos_a$=[2, s.len]." The subsequent abstract value of "$k_a$" ([2, s.len]) may be subsumed in the previous abstract value of "$k_a$" ([1, s.len]) such that a fix-point may be reached with respect to the "for" loop and execution of the "for" loop and the corresponding defining, deriving, and/or refining of abstract values associated with the "for" loop may be terminated.

The exit of the body of the "for" loop and the skipping of the "for" loop as a sort of exit from the "for" loop may correspond to a merge point of the function "int find_last_of" where the first path and the second path may merge. Accordingly, the first and second return abstractions may be joined with a union operation to generate a return abstract value "$retval_a$" for a symbolic return value "$retval_s$" as follows: "$retval_a$=$retval_a^1$∪$retval_a^2$=[0, s.len−1]∪[−1, −1]=[−1, s.len−1]."

An assumption may be generated based on the return abstract value "$retval_a$," such as described with respect to block 326 of FIG. 3. For example, Table 2 below includes code that may inserted with the code of the software function "int find_last_of" of Table 1 that illustrates an example of generating the assumption based on the return abstract value "$retval_a$." This code may be used in the abstraction execution step 216 of the flow 200 during lazy symbolic execution.

TABLE 2

```
1.  this object: string s
2.  int find_last_of(char c, int pos = -1) {
3.      int len = this.length( );
4.      int pos = pos > len ? len : pos;
5.      int i = new_symbolic_var( ); // retval
6.      _assume(i >= -1 && i < len);
7.      _assume(find_last_of_imp(i, *this, c, pos));
8.      return i;
9.  }
```

In the example associated with Table 2, the code at line 5 of Table 2 may generate a new symbolic return value "i" based on the symbolic return value "$retval_s$." Additionally, the code at line 6 may generate an assumption for "i" based on the interval "[-1, s.len-1]" of the return abstract value "$retval_a$."

The code associated with Table 2 may also include a call to a declarative function that may be based on the function "int find_last_of" associated with Table 1. For example, the code at line 7 of Table 2 may use an assumption to call a declarative function "find_last_of_imp" that may be based on the function "find_last_of" outlined in Table 1 and called at line 1 of Table 2. As indicated by a comparison between lines 1 and 7 of Table 2, the declarative function "find_last_of_imp" may include the symbolic return value "i" and the object "*this" as additional input arguments as compared to the function "find_last_of." The declaration and generation of the declarative function "find_last_of_imp" is described in further detail below with respect to Table 3.

In the original function, statement "return . . . " returns a value. In the abstraction, this value has been represented by the symbolic return value "$retval_s$," which is passed into function "find_last_of_imp" as an extra argument "i." The declarative function encodes this information by constraining the return values in terms of "i" such that "$retval_s$" returns the correct value. For example, the statement "return-1" is replaced by "_test(i==-1); return," and the statement "return k-1" is replaced by "_test(i==k-1); return." Here "_test" informs the executor to abort the paths where the condition is not satisfied, hence "_test(I==-1)" may pass only the return value is -1.

TABLE 3

```
1.  _LAZY
2.  {void find_last_of_imp(int i, string& s, char c, int pos) {
3.      for (int k = pos; k > 0; --k) {
4.          if (s[k-1] == c)
5.              int i = new_symbolic_var( ); // retval
6.          { _test(i == k - 1); return; }
7.      }
8.      _test(i == -1);
9.  }
```

As mentioned above, Table 3 includes code that may be used to declare and define the declarative function "find_last_of_imp," according to at least one embodiment described herein. In some embodiments, the code of Table 3 may be generated based on the method 400 described above with respect to FIG. 4. For example, the code at line 1 of Table 3, may declare the declarative function "find_last_of_imp" as a "lazy" function, such as described with respect to block 404 of FIG. 4. Additionally, the code at line 2 may define the arguments that may be used as inputs for the declarative function "find_last_of_imp." The inputs may include the inputs for the function "find_last_of," an input "i" for the symbolic return value "i," and an input "s" for the string object "s" that may be associated with the function "find_last_of." Therefore, the input "i" and the input "s" may be added as additional arguments to the declarative function "find_last_of_imp" as compared to the arguments of the function "find_last_of," such as described above with respect to block 406 of FIG. 4.

Lines 6 and 8 insert a "_test" statement for the return statements in the function "find_last_of," which may be found in lines 7 and 9 of Table 1. Therefore, the return statements in the function "find_last_of" may be replaced in the declarative function "find_last_of_imp," such as described above with respect to block 408 of FIG. 4.

Accordingly, abstractions and a corresponding declarative function "find_last_of_imp" may be generated for the function "find_last_of" according to one or more operations corresponding to methods 300 and 400 as described with respect to Tables 1-3. The above is merely an example that describes the use and operation of the principles described with respect to methods 300 and 400 and is not limiting. Any number of different abstractions and declarative functions may be derived for any number of different functions using the principles outlined in the methods 300 and 400.

Figure 5:
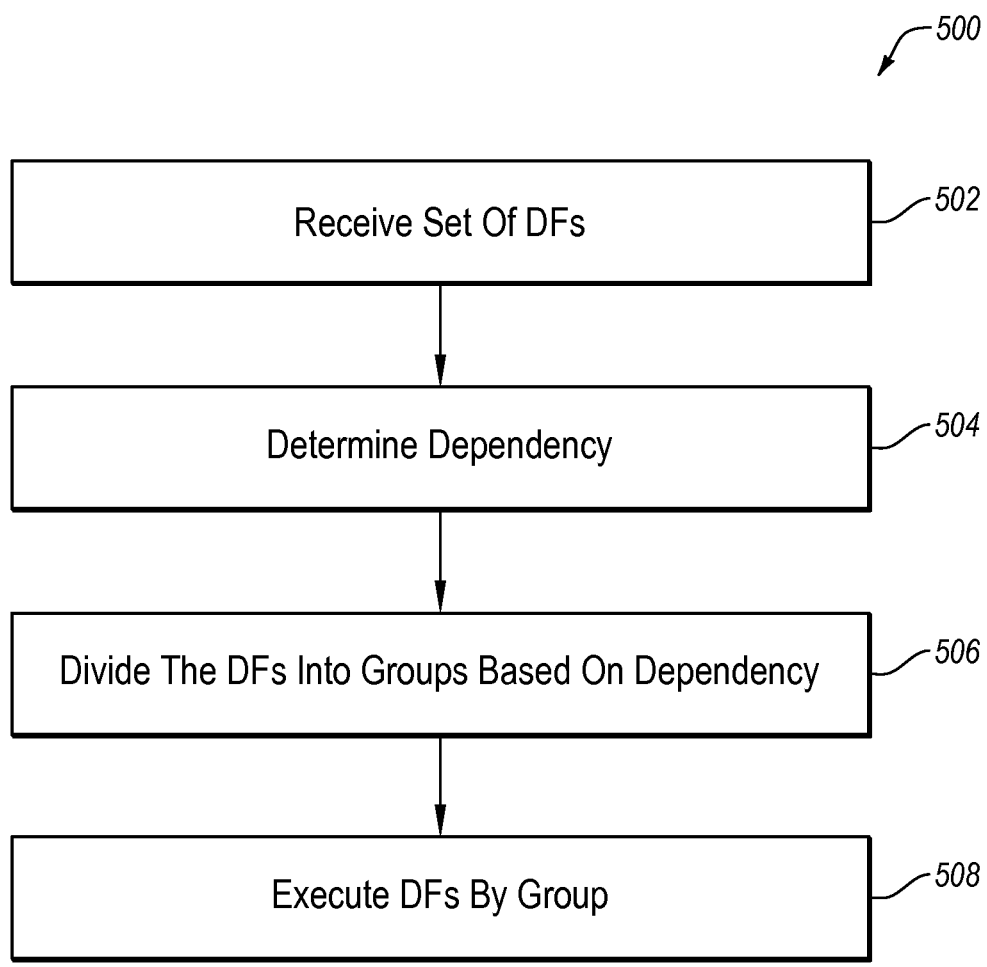
FIG. 5 is a flowchart of another example method of testing software.

FIG. 5 is a flowchart of an example method 500 of scheduling execution of declarative functions, arranged in accordance with at least one embodiment described herein. The method 500 may be implemented, in some embodiments, by a testing system, such as the test module 106 of FIGS. 1A and 1B. Additionally, in some embodiments, the method 500 may be used to perform one or more operations associated with the declarative function scheduling 218 of the flow 200 of FIG. 2. Although illustrated as including discrete blocks, various blocks of the method 500 may be divided into additional blocks, combined into fewer blocks, or eliminated, depending on the desired implementation.

The method 500 may begin at block 502, where a set of declarative functions (indicated as "DFs" in FIG. 5) may be received. At block 504, dependency of the declarative functions in the set of declarative functions may be determined. The dependency may be determined by determining which variables may be accessed by the same declarative functions where declarative functions that access one or more of the same variables may be considered dependent. In some embodiments, the dependency may be determined through a standard data-flow analysis.

At block 506, the declarative functions may be divided into groups based on their dependency. For example, declarative functions that all access a first variable may be divided into a first group and declarative functions that all access a second variable may be divided into a second group.

At block 508, the declarative functions may be executed according to their respective groups. For example, the declarative functions associated with the first group described above may be executed before the declarative functions associated with the second group described above. Additionally, when a conflict is found within a group, the remaining unexecuted declarative functions within that group may not be executed. Therefore, the number of paths that may be unnecessarily explored during the lazy symbolic execution may be reduced.

Accordingly, the method 500 may be used to schedule and execute the declarative functions in a manner that may reduce the amount of execution that may be performed. One skilled in the art will appreciate that the functions performed in the method 500 may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

For example, Table 4 below includes code that invokes string operation functions "find_last_of" and "contains" as well as a computation intensive function "hash." Since the first assumption asserts that string "s1" contains character '/', and the second assumption requires that "s1" does not contain '/', the code will not produce any valid test case. Hence, all execution paths are fruitless. Suppose the length of string "s1" is len. If no declarative function scheduling is used, the executor will visit $O(2^{len+len+m})$ paths, each of which executes the expensive "hash" function. With declarative function scheduling, the declarative function of "s1.contains ("/")" may be reordered to execute before the statement "hash(i1)" of the declarative function of since these two declarative functions share no common variables. Hence, in this example, the executor may visit $O(2^{len+len})$ paths, leading to an improvement of $2^m$ times. More importantly, the expensive hash_DI may not be executed.

TABLE 4

| | |
|---|---|
| 1. | void example( ) { |
| 2. | string s1 = mk_symbolic_string( ); |
| 3. | string i1 = mk_symbolic_int( ); |
| 4. | assume(s1.find_last_of('/') == −1); |
| 5. | assume(hash(i1)); |
| 6. | assume(s1.contains ("/") ); |
| 7. | } |

As used herein, the terms "module" or "component" may refer to specific hardware implementations configured to perform the actions of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of testing software, the method comprising:
generating a symbolic value for a return value of a software function of a software program during mixed symbolic and abstraction execution ("mixed execution") of the software program, one or more paths of the software function including the return value, the mixed execution maintaining symbolic values, abstract values, and constraints of one or more variables of the software function;
deriving, during the mixed execution, an abstraction for the symbolic value based on the return value of the one or more paths satisfying the abstraction, the abstraction constraining the symbolic value;
generating an assumption for the symbolic value in the software program based on the abstraction such that the assumption constrains the symbolic value;
generating a declarative function based on the symbolic value as constrained by the assumption and based on the software function; and
exploring, during the mixed execution, the one or more paths of the software function that correspond to the return value based on the symbolic value as constrained by the abstraction by executing the declarative function such that a number of the one or more paths explored during the symbolic execution is constrained by the abstraction, the execution of the declarative function being delayed until the symbolic execution reaches an end of a path of the software program.

2. The method of claim 1, further comprising modifying the abstraction based on a control flow of the software function.

3. The method of claim 2, wherein the control flow includes one or more instructions that include one or more of a data processing instruction, a branch, a branch merge point, and a loop.

4. The method of claim 1, further comprising replacing, during the symbolic execution, the software function with the assumption and the declarative function.

5. The method of claim 1, wherein generating the declarative function includes extending the software function by adding the symbolic value, as constrained by the assumption, as an extra argument to generate the declarative function.

6. The method of claim 5, wherein generating the declarative function includes extending the software function by adding an object corresponding to the software function, as another extra argument to generate the declarative function.

7. The method of claim 1, wherein generating the declarative function includes replacing a return statement of the software function with a test statement that terminates an associated path when a test condition of the test statement is falsified.

8. The method of claim 1, further comprising invoking the declarative function together with another declarative function based on both declarative functions accessing one or more variables that are the same.

9. The method of claim 1, further comprising ordering and scheduling declarative functions based on the declarative functions accessing one or more variables that are the same.

10. The method of claim 1, wherein the abstraction is one or more of a symbolic predicate when the return value is a Boolean value and an interval that bounds the symbolic value.

11. Non-transitory computer-readable storage media including computer-executable instructions configured to cause a system to perform operations to test software, the operations comprising:

generating a symbolic value for a return value of a software function of a software program during mixed symbolic and abstraction execution ("mixed execution") of the software program, one or more paths of the software function including the return value, the mixed execution maintaining symbolic values, abstract values, and constraints of one or more variables of the software function;

deriving, during the mixed execution, an abstraction for the symbolic value based on the return value of the one or more paths satisfying the abstraction, the abstraction constraining the symbolic value;

generating an assumption for the symbolic value in the software program based on the abstraction such that the assumption constrains the symbolic value;

generating a declarative function based on the symbolic value as constrained by the assumption and based on the software function; and exploring, during the mixed execution, the one or more paths of the software function that correspond to the return value based on the symbolic value as constrained by the abstraction by executing the declarative function such that a number of the one or more paths explored during the symbolic execution is constrained by the abstraction, the execution of the declarative function being delayed until the symbolic execution reaches an end of a path of the software program.

12. The non-transitory computer-readable storage media of claim 11, wherein the operations further comprise modifying the abstraction based on a control flow of the software function.

13. The non-transitory computer-readable storage media of claim 11, wherein the operations further comprise replacing, during the symbolic execution, the software function with the assumption and the declarative function.

14. The non-transitory computer-readable storage media of claim 11, wherein generating the declarative function includes extending the software function by adding the symbolic value, as constrained by the assumption, as an extra argument to generate the declarative function.

15. The non-transitory computer-readable storage media of claim 14, wherein generating the declarative function includes extending the software function by adding an object corresponding to the software function, as another extra argument to generate the declarative function.

16. The non-transitory computer-readable storage media of claim 11, wherein generating the declarative function includes replacing a return statement of the software function with a test statement that terminates an associated path when a test condition of the test statement is falsified.

17. The non-transitory computer-readable storage media of claim 11, wherein the operations further comprise ordering and scheduling declarative functions based on the declarative functions accessing one or more variables that are the same.

18. The non-transitory computer-readable storage media of claim 11, wherein the abstraction is one or more of a symbolic predicate when the return value is a Boolean value and an interval that bounds the symbolic value.

* * * * *